(12) United States Patent
Maeda et al.

(10) Patent No.: US 7,785,085 B2
(45) Date of Patent: Aug. 31, 2010

(54) PISTON PUMP

(75) Inventors: Junichi Maeda, Kariya (JP); Toru Fujita, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1233 days.

(21) Appl. No.: 10/954,773

(22) Filed: Oct. 1, 2004

(65) Prior Publication Data

US 2005/0074348 A1    Apr. 7, 2005

(30) Foreign Application Priority Data

Oct. 3, 2003   (JP) .............................. 2003-345310
Oct. 10, 2003  (JP) .............................. 2003-352570

(51) Int. Cl.
  F04B 53/12   (2006.01)
  F04B 19/00   (2006.01)
(52) U.S. Cl. ..................... 417/554; 417/470; 417/525; 92/171.1
(58) Field of Classification Search ................. 417/470, 417/525, 546, 554; 92/171.1; 29/453, 525; 285/921
  See application file for complete search history.

(56) References Cited

U.S. PATENT DOCUMENTS

| | | | |
|---|---|---|---|
| 5,131,818 A * | 7/1992 | Wittkop et al. ............. | 417/273 |
| 5,409,399 A * | 4/1995 | Geoghegan et al. ......... | 439/567 |
| 5,577,896 A | 11/1996 | Harada | |
| 6,082,244 A | 7/2000 | Siegel et al. | |
| 6,093,003 A | 7/2000 | Hauser et al. | |
| 6,224,352 B1 | 5/2001 | Hauser et al. | |
| 6,302,663 B1 | 10/2001 | Schuller et al. | |

(Continued)

FOREIGN PATENT DOCUMENTS

JP    7-035035 A    2/1995

(Continued)

OTHER PUBLICATIONS

Official Action issued in corres. JP Patent Application No. 2003-352570, Apr. 15, 2008, JPO; and English-language translation thereof.

(Continued)

Primary Examiner—Devon C Kramer
Assistant Examiner—Patrick Hamo
(74) Attorney, Agent, or Firm—Buchanan Ingersoll & Rooney PC

(57) ABSTRACT

A piston pump includes a pump housing having a suction port, a discharge port, and an internal cavity; a first cylinder member having a cylinder bore; a piston built into the cylinder bore of the first cylinder member to thereby form a pump chamber and adapted to change the volume of the pump chamber by means of axially reciprocating movement; a suction valve provided in the piston; and a discharge valve provided at the discharge side of the pump chamber. A circumferential protrusion is formed externally at an axially intermediate portion of the first cylinder member. The first cylinder member is press-fitted, at the circumferential protrusion, into the internal cavity of the pump housing. A leading end portion of the first cylinder member from which the first cylinder member is inserted into the pump housing has a diameter smaller than that of the internal cavity of the pump housing.

11 Claims, 4 Drawing Sheets

U.S. PATENT DOCUMENTS 6,341,950 B1    1/2002  Schuller et al.
6,481,759 B1 *  11/2002 Kawasaki et al. ........... 285/319

FOREIGN PATENT DOCUMENTS

| JP | 10-266944 A | 10/1998 |
| --- | --- | --- |
| JP | 10-266971 A | 10/1998 |
| JP | 11-093851 A | 4/1999 |
| JP | 11-351152 A | 12/1999 |
| JP | 2001-501283 A | 1/2001 |
| JP | 3278982 | 2/2002 |
| JP | 2002-514712 | 5/2002 |

OTHER PUBLICATIONS

Official Action issued in corres. JP Patent Application No. 2003-345310, Apr. 15, 2008, JPO; and English-language translation thereof.

Official Action issued by the Japanese Patent Office in corres. JP Patent Application No. 2003-345310, Jul. 1, 2008, JPO, JP; and partial English-language translation thereof.

* cited by examiner

PISTON PUMP

BACKGROUND OF THE INVENTION

1. Field of the Invention

The present invention relates to a piston pump for use in, for example, a vehicular brake apparatus.

2. Description of the Related Art

Piston pumps of such a type are disclosed in, for example, Japanese kohyo (PCT) patent publication No. 2002-514712 (which discloses an ordinary piston pump not having a function of charging fluid into a pump chamber) and Japanese Patent No. 3278982 (which discloses a self-priming piston pump having a function of charging fluid into a pump chamber).

The ordinary piston pump (non-self-priming piston pump) disclosed in Japanese kohyo (PCT) patent publication No. 2002-514712 includes a pump housing having a suction port, a discharge port, and an internal cavity; a first cylinder member having a cylinder bore and built into the internal cavity of the pump housing; a piston built into the cylinder bore of the first cylinder member to thereby form a pump chamber in the cylinder bore and adapted to change the volume of the pump chamber by means of axially reciprocating movement thereof; a suction valve provided in the piston, which opens when the volume of the pump chamber increases, and closes when the volume decreases; and a discharge valve provided at the discharge side of the pump chamber, which opens when the volume of the pump chamber decreases, and closes when the volume increases. The piston axially reciprocates to thereby increase and decrease the volume of the pump chamber, whereby fluid flows from the suction port to the discharge port.

The self-priming piston pump disclosed in Japanese Patent No. 3278982 includes a pump housing having a suction port, a discharge port, and an internal cavity; a first cylinder member having a cylinder bore and built into the internal cavity of the pump housing; a piston built into the cylinder bore of the first cylinder member to thereby form a pump chamber in the cylinder bore and adapted to change the volume of the pump chamber by means of axially reciprocating movement thereof; a suction valve provided in the piston, which opens when the volume of the pump chamber increases, and closes when the volume decreases; a discharge valve provided at the discharge side of the pump chamber, which opens when the volume of the pump chamber decreases, and closes when the volume increases; a second cylinder member disposed coaxially at the suction side of the first cylinder member and built into the internal cavity of the pump housing; and a sliding ring built into the cylinder bore of the second cylinder member to thereby dividingly form a suction chamber communicating with the suction port, and a discharge chamber communicating with the pump chamber or the suction chamber, and adapted to charge fluid into the discharge chamber from the suction chamber and into the pump chamber from the discharge chamber by means of axially reciprocating in relation to the piston and the second cylinder member and synchronously with a change in the volume of the pump chamber.

In the above-described conventional non-self-priming piston pump, the first cylinder member assumes the form of a sleeve having a fixed outside diameter and is press-fitted into the internal cavity of the pump housing to thereby maintain a seal between the same and the surface of the internal cavity. In the piston pump, in the course of press-fitting the first cylinder member into the internal cavity of the pump housing, a leading end portion of the first cylinder member may gall the surface of the internal cavity of the pump housing; as a result, the first cylinder member potentially fails to maintain a seal between the same and the surface of the internal cavity. Furthermore, press-fitting load may become excessively large and cause deformation (buckling) of the first cylinder member, potentially resulting in deformation of the cylinder bore, which accommodates the piston such that the piston can reciprocate axially therein.

In the above-described conventional self-priming piston pump, a spring case is crimped to the outer circumference of an end portion of the second cylinder member to thereby partially constitute a discharge valve, and covers the outer circumference of a portion of the first cylinder member, the outer circumference of the end portion of the second cylinder member, and the outer circumference of a washer sandwiched between the first cylinder member and the second cylinder member to thereby maintain a seal between the same and the outer surface of the first cylinder member. Also, a seal ring is attached to the outer circumference of each of the spring case and the second cylinder member. In this manner, various members are required to seal the first cylinder member and the second cylinder member.

SUMMARY OF THE INVENTION

In view of the foregoing, an object of the present invention is to provide a piston pump in which a first cylinder member is press-fitted into the internal cavity of a pump housing to thereby reduce the number of component parts thereof and which allows the first cylinder member to be press-fitted in such an improved condition as to assure the seal integrity between the first cylinder member and the surface of the internal cavity of the pump housing and as to suppress deformation of a cylinder bore.

To achieve the above object, the present invention provides a piston pump comprising a pump housing having a suction port, a discharge port, and an internal cavity; a first cylinder member having a cylinder bore and built into the internal cavity of the pump housing; a piston built into the cylinder bore of the first cylinder member to thereby form a pump chamber in the cylinder bore, the piston being axially reciprocated so as to increase and decrease a volume of the pump chamber; a suction valve provided in the piston, which opens when the volume of the pump chamber increases, and closes when the volume decreases; and a discharge valve provided at the discharge side of the pump chamber, which opens when the volume of the pump chamber decreases, and closes when the volume increases. The piston is axially reciprocated so as to increase and decrease the volume of the pump chamber to thereby cause fluid to flow from the suction port to the discharge port. In the piston pump, a circumferential protrusion having a smooth exterior shape is formed externally at an axially intermediate portion of the first cylinder member; the first cylinder member is press-fitted, at the circumferential protrusion, into the internal cavity of the pump housing; and a leading end portion of the first cylinder member has a diameter smaller than that of the internal cavity of the pump housing, the leading end portion extending from the circumferential protrusion in a direction of insertion of the first cylinder member into the pump housing.

In the piston pump of the present invention, a leading end portion (front end portion) of the first cylinder member, which portion extends forward from the circumferential protrusion, has a diameter smaller than that of the internal cavity of the pump housing. Thus, in the course of press-fitting the first cylinder member into the internal cavity of the pump housing, the leading end portion of the first cylinder member does not gall the surface of the internal cavity of the pump housing.

Since the circumferential protrusion formed externally on the first cylinder member has a smooth exterior shape, the circumferential protrusion can be smoothly press-fitted into the internal cavity of the pump housing.

Thus, manufacture of the piston pump can be free of occurrence of galling between the first cylinder member and the surface of the internal cavity of the pump housing, thereby assuring the seal integrity between the first cylinder member and the surface of the internal cavity of the pump housing. Also, press-fit load can be reduced, thereby suppressing deformation (buckling) of the first cylinder member and thus suppressing deformation of the cylinder bore, which accommodates the piston such that the piston can reciprocate axially therein.

Preferably, the first cylinder member is a press-shaped part, and the circumferential protrusion is formed such that a portion of the first cylinder member protrudes radially outward in an expanded condition. In this case, the first cylinder member can be readily manufactured at reduced cost.

Preferably, the circumferential protrusion is formed outside the range of reciprocation of the piston. In this case, press-fitting the first cylinder member into the internal cavity of the pump housing does not cause deformation of the cylinder bore of the first cylinder member over the range of reciprocation of the piston. Thus, a sufficient allowance can be provided for press-fitting of the circumferential protrusion into the internal cavity of the pump housing without impairing reciprocation of the piston in the cylinder bore of the first cylinder member. Thus, the seal integrity between the first cylinder member and the surface of the internal cavity of the pump housing can be assured, and satisfactory reciprocation of the piston in the cylinder bore of the first cylinder member can be assured.

Preferably, a bottom wall having a valve hole and a valve seat formed for the discharge valve is formed at a discharge end portion of the first cylinder member, and the circumferential protrusion is located in the vicinity of the bottom wall. In this case, the bottom wall of the first cylinder member can impart sufficiently high, radial rigidity to the circumferential protrusion, thereby suppressing radially inward deformation of the circumferential protrusion press-fitted into the internal cavity of the pump housing and thus suppressing a drop in surface pressure (an impairment in seal integrity) at a press-fitted portion, which could otherwise result from the deformation of the circumferential protrusion.

Preferably, the piston pump of the present invention further comprises a cylindrical case made of resin for supporting a filter through which fluid flows from the suction port to the discharge port, the cylindrical case being fitted onto the leading end portion of the first cylinder member and being fitted into the internal cavity of the pump housing. In this case, in the course of press-fitting the first cylinder member into the internal cavity of the pump housing, the cylindrical case serves as a guide, thereby restricting tilting of the first cylinder member within the pump housing. Thus, the circumferential protrusion of the first cylinder member is press-fitted into the internal cavity of the pump housing without involvement of galling between the circumferential protrusion and the surface of the internal cavity of the pump housing.

Preferably, in the case of application of the present invention to a self-priming piston pump, the piston pump of the present invention further comprises a second cylinder member disposed coaxially at the leading end portion of the first cylinder member and built into the internal cavity of the pump housing; and a sliding ring built into the cylinder bore of the second cylinder member to thereby dividingly form a suction chamber communicating with the suction port, and a discharge chamber communicating with the pump chamber or the suction chamber, and adapted to charge fluid into the discharge chamber from the suction chamber and into the pump chamber from the discharge chamber by means of axially reciprocating in relation to the piston and the second cylinder member and synchronously with a change in the volume of the pump chamber. In the piston pump, the first cylinder member and the second cylinder member are formed without involvement of cutting.

In the aforementioned conventional self-priming piston pump, a cylinder bore (called a sliding bore in the aforementioned publication) and a discharge hole (called a discharge path in the aforementioned publication) are drilled in the first cylinder member, which, together with the piston, forms a pump chamber; and a piston support bore (called a piston bore in the aforementioned publication), a cylinder bore (called a large-diameter bore in the aforementioned publication), and a plurality of radially extending communication holes (called suction ports in the aforementioned publication) are drilled in the second cylinder member, which accommodates the sliding ring. In other words, cutting is involved in formation of the first and second cylinder members.

By contrast, the first and second cylinder members employed in the piston pump of the present invention are formed without involvement of cutting (i.e., the first and second cylinder members are, for example, forged parts, press-shaped parts, or resin-molded parts). In contrast to the case where cutting is involved in formation of the first and second cylinder members, the first and second cylinder members can be manufactured at lower cost. Since the first and second cylinder members are formed without involvement of cutting, generation of foreign matter, such as burrs, can be suppressed in the course of manufacture thereof. Thus, entry of such foreign matter into the piston pump can be prevented.

Preferably, a first end portion of the second cylinder member is press-fitted onto the leading end portion of the first cylinder member, and a projection is formed at a second end portion of the second cylinder member in such a manner as to be capable of abutting the sliding ring or the piston so as to prevent coming off of the piston. In this case, through employment of a simple structure of forming the projection, the first cylinder member, the second cylinder member, the piston, the sliding ring, and the like can be subassembled into a subassembly before being built into the pump housing.

Preferably, the second cylinder member is a resin-molded part, and a filter through which fluid flows from the suction port to the suction chamber is attached to the second cylinder member. In this case, the second cylinder member also serves as a support member for the filter. Preferably, an end portion of the piston projecting from the first cylinder member projects through the second cylinder member in a noncontact condition, and the piston is supported, at the end portion projecting from the second cylinder member, in an axially movable condition by the pump housing via an annular seal member.

The annular seal member provided in the present invention between the projecting portion of the piston and the pump housing yields the following functions yielded in the conventional self-priming piston pump: the function of a piston seal ring intervening between the piston and the second cylinder member (a function of shutting off communication between the interior and the exterior of the second cylinder member); and the function of a cylinder seal ring intervening between the second cylinder member and the pump housing (a function of shutting off communication between the interior and the exterior of the pump housing). Thus, the number of seal members used in the piston pump can be reduced, thereby contributing to a reduction in the number of component parts of the piston pump.

Preferably, the annular seal member is mounted in the pump housing at a position corresponding to the projecting end portion of the piston, and the second end portion of the second cylinder member restricts axial movement of the annular seal member. In this case, the second end portion of the second cylinder member can function as a stopper for preventing the annular seal member from coming off.

Preferably, axially extending fine grooves are formed on the inner circumferential wall of the second cylinder member, along which the outer circumferential surface of the sliding ring slides. In this case, in the course of removing air (in the course of evacuation) for filling the piston pump with fluid (liquid), air can be reliably removed from the discharge chamber via the fine grooves.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
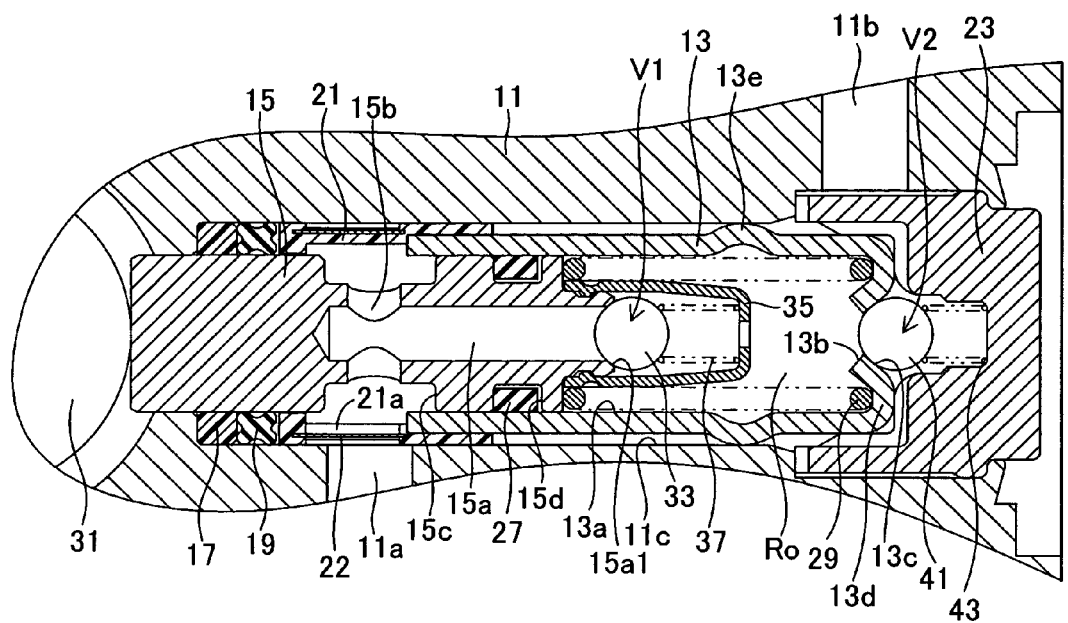
FIG. 1 is a general, configurational view showing a piston pump according to a first embodiment of the present invention.

Embodiments of the present invention will next be described in detail with reference to the drawings. FIG. 1 shows a first embodiment of a piston pump according to the present invention. In the piston pump of the first embodiment, a pump housing 11 has a suction port 11a, a discharge port 11b, and an internal cavity 11c. A cylinder member 13, which serves as a first cylinder member of the present invention, a piston 15, a suction valve V1, and a discharge valve V2 are built into the internal cavity 11c of the pump housing 11.

The cylinder member 13 is a press-shaped metal part and is formed into a tubular shape having a bottom. Specifically, the cylinder member 13 has a cylinder bore 13a and a bottom wall 13d, which has a valve hole 13b and a valve seat 13c formed for the discharge valve V2. The cylinder member 13 has an outside diameter smaller than the diameter of the internal cavity 11c of the pump housing 11 and has a circumferential protrusion 13e formed externally at a portion biased toward the bottom wall 13d from its central portion; i.e., at an axially intermediate portion thereof. The circumferential protrusion 13e is formed outside the range of reciprocation of the piston 15 such that a portion of the cylinder member 13 protrudes radially outward in an expanded condition. The circumferential protrusion 13e has a smooth exterior shape and is press-fitted into the internal cavity 11c of the pump housing 11.

The cylinder member 13, the piston 15, a guide ring 17, a seal ring 19, and a cylindrical case 21 are built into the internal cavity 11c of the pump housing 11. A cap 23 prevents the cylinder member 13 from coming off the pump housing 11. A first end portion (right-hand end portion in FIG. 1) of the piston 15, a seal member 27, and the suction valve V1 are built into the cylinder bore 13a formed in the cylinder member 13; and a piston return spring 29 is also built into the cylinder bore 13a.

A second end portion (left-end portion in FIG. 1) of the piston 15 is fitted into the internal cavity 11c of the pump housing 11 via the guide ring 17 and the seal ring 19 in a fluid-tight, axially slidable condition. The second end of the piston 15 is slidably engaged with the curved outer surface of an eccentric member 31, which is rotatably driven by means of an electric motor (not shown). The first end portion of the piston 15 and the seal member 27 attached to the first end portion partially define a pump chamber Ro in the cylinder bore 13a. When rotation of the eccentric member 31 causes the piston 15 to move axially against a biasing force of the piston return spring 29, the volume of the pump chamber Ro decreases. When the piston 15 is axially biased by the piston return spring 29, the volume of the pump chamber Ro increases.

The piston 15 has an axially extending communicating bore 15a and two radially extending communicating holes 15b formed therein. The piston 15 also has a circumferential groove 15c formed at a position corresponding to the communicating holes 15b. The communicating bore 15a opens into the pump chamber Ro at its first end, which functions as a valve hole for the suction valve V1. A valve seat 15a1 for the suction valve V1 is formed at the first end portion of the piston 15. The communicating holes 15b are formed at an axially intermediate portion of the piston 15 and communicate with a second end portion of the communicating bore 15a at their radially inner ends and with the circumferential groove 15c at their radially outer ends. The circumferential groove 15c communicates with the suction port 11a of the pump housing 11 via a filter 22 attached to the cylindrical case 21. Thus, fluid (liquid) that flows in the pump housing 11 from the suction port 11a to the discharge port 11b passes through the filter 22.

The cylindrical case 21 is a resin-molded part and is fitted into the internal cavity 11c of the pump housing 11 while being press-fitted, at its one end portion, coaxially onto the leading/suction end portion (left-hand end portion in FIG. 1) of the cylinder member 13. A plurality of suction holes 21a are formed at an axially intermediate portion of the cylindrical case 21. The filter 22 is attached to the cylindrical case 21 at a position corresponding to the suction holes 21a. The filter 22 is a single unit member having a cylindrical shape.

The seal member 27 is an annular seal member and is interposed between the cylinder member 13 and the piston 15 so as to maintain a seal therebetween. The seal member 27 is fitted into a mounting groove 15d formed on the piston 15. The seal member 27 and the piston 15 reciprocate unitarily. The piston return spring 29 is a compression coil spring and is interposed between the cylinder member 13 and the piston 15 while a preload is imposed thereon. The piston return spring 29 biases the piston 15, the seal member 27, and the suction valve V1, among others, toward the eccentric member 31.

The suction valve V1 is provided at an end portion of the piston 15 located on the side toward the pump chamber Ro. The suction valve V1 includes a ball valve body 33, which is seated on or departs from the valve seat 15a1 formed on the piston 15; and a spring 37 interposed between the ball valve body 33 and a spring retainer 35 and biasing the ball valve body 33 toward the valve seat 15a1 by means of imposing a small load on the ball valve body 33. The suction valve V1 opens when the volume of the pump chamber Ro increases, and closes when the volume decreases. The spring retainer 35 is fixedly snap-fitted to the piston 15.

The discharge valve V2 is provided at a discharge end portion of the cylinder member 13. The discharge end portion corresponds to the discharge side of the pump chamber Ro. The discharge valve V2 includes a ball valve body 41, which is seated on or departs from the valve seat 13c formed on the bottom wall 13d of the cylinder member 13; and a spring 43 interposed between the ball valve body 41 and the cap 23 and biasing the ball valve body 41 toward the valve seat 13c by means of imposing a small load on the ball valve body 41. The discharge valve V2 closes when the volume of the pump chamber Ro increases, and opens when the volume decreases.

In the thus-configured piston pump of the first embodiment, when the electric motor (not shown) rotates the eccentric member 31, the eccentric member 31 and the piston return spring 29 cooperatively function to axially reciprocate the piston 15, thereby alternately increasing and decreasing the volume of the pump chamber Ro. The suction valve V1 and the discharge valve V2 function accordingly, whereby fluid flows from the suction port 11a to the discharge port 11b.

In the piston pump of the first embodiment, the cylinder member 13 has a diameter smaller than that of the internal cavity 11c of the pump housing 11. Thus, in the course of press-fitting the cylinder member 13 into the internal cavity 11c of the pump housing 11, the leading end portion (front end portion) of the cylinder member 13 does not gall the surface of the internal cavity 11c of the pump housing 11. Since the circumferential protrusion 13e formed externally on the cylinder member 13 has a smooth exterior shape, the circumferential protrusion 13e can be smoothly press-fitted into the internal cavity 11c of the pump housing 11.

Thus, manufacture of the piston pump can be free of occurrence of galling between the cylinder member 13 and the surface of the internal cavity 11c of the pump housing 11, thereby assuring the seal integrity between the cylinder member 13 and the surface of the internal cavity 11c of the pump housing 11. Also, press-fit load can be reduced, thereby suppressing deformation (buckling) of the cylinder member 13 and thus suppressing deformation of the cylinder bore 13a, which accommodates the piston 15 such that the piston 15 can reciprocate axially therein.

In the piston pump of the first embodiment, the cylinder member 13 is a press-shaped part, and the circumferential protrusion 13e is formed such that a portion of the cylinder member 13 protrudes radially outward in an expanded condition. Thus, the cylinder member 13 can be readily manufactured at reduced cost.

In the piston pump of the first embodiment, the circumferential protrusion 13e is formed outside the range of reciprocation of the piston 15. Accordingly, press-fitting the cylinder member 13 into the internal cavity 11c of the pump housing 11 does not cause deformation of the cylinder bore 13a of the cylinder member 13 over the range of reciprocation of the piston 15. Thus, a sufficient allowance can be provided for press-fitting of the circumferential protrusion 13e into the internal cavity 11c of the pump housing 11 without impairing reciprocation of the piston 15 in the cylinder bore 13a of the cylinder member 13. Thus, the seal integrity between the cylinder member 13 and the surface of the internal cavity 11c of the pump housing 11 can be assured, and satisfactory reciprocation of the piston 15 in the cylinder bore 13a of the cylinder member 13 can be assured.

In the piston pump of the first embodiment, the bottom wall 13d having the valve hole 13b and the valve seat 13c formed for the discharge valve V2 is formed at a discharge end portion of the cylinder member 13, and the circumferential protrusion 13e is located in the vicinity of the bottom wall 13d. Thus, the bottom wall 13d of the cylinder member 13 can impart sufficiently high, radial rigidity to the circumferential protrusion 13e, thereby suppressing radially inward deformation of the circumferential protrusion 13e press-fitted into the internal cavity 11c of the pump housing 11 and thus suppressing a drop in surface pressure (an impairment in seal integrity) at a press-fitted portion, which could otherwise result from the deformation of the circumferential protrusion 13e.

In the piston pump of the first embodiment, the cylindrical case 21 made of resin for supporting the filter 22 is fitted onto the leading end portion of the cylinder member 13 and is fitted into the internal cavity 11c of the pump housing 11. Accordingly, in the course of press-fitting the cylinder member 13 into the internal cavity 11c of the pump housing 11, the cylindrical case 21 serves as a guide, thereby restricting tilting of the cylinder member 13 within the pump housing 11. Thus, the circumferential protrusion 13e of the cylinder member 13 is press-fitted into the internal cavity 11c of the pump housing 11 without involvement of galling between the circumferential protrusion 13e and the surface of the internal cavity 11c of the pump housing 11.

The first embodiment is described while mentioning a non-self-priming piston pump. However, the present invention can be embodied in the form of a self-priming piston pump as disclosed in Japanese Patent No. 3278982.

Figure 2:
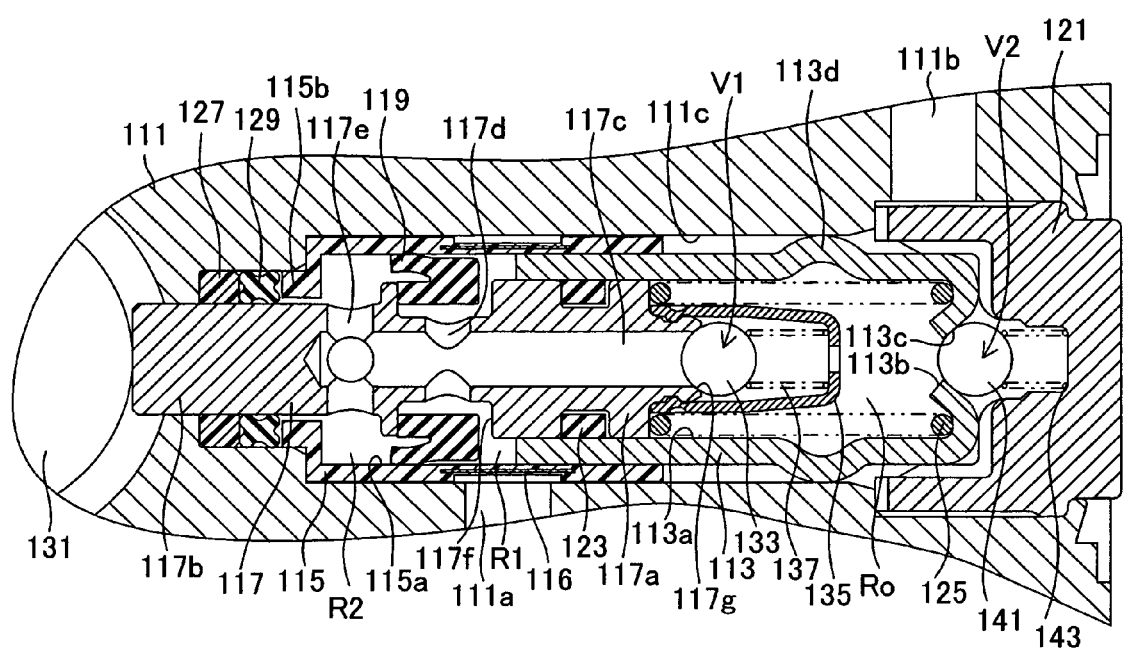
FIG. 2 is a general, configurational view showing a piston pump according to a second embodiment of the present invention.
Figure 3:
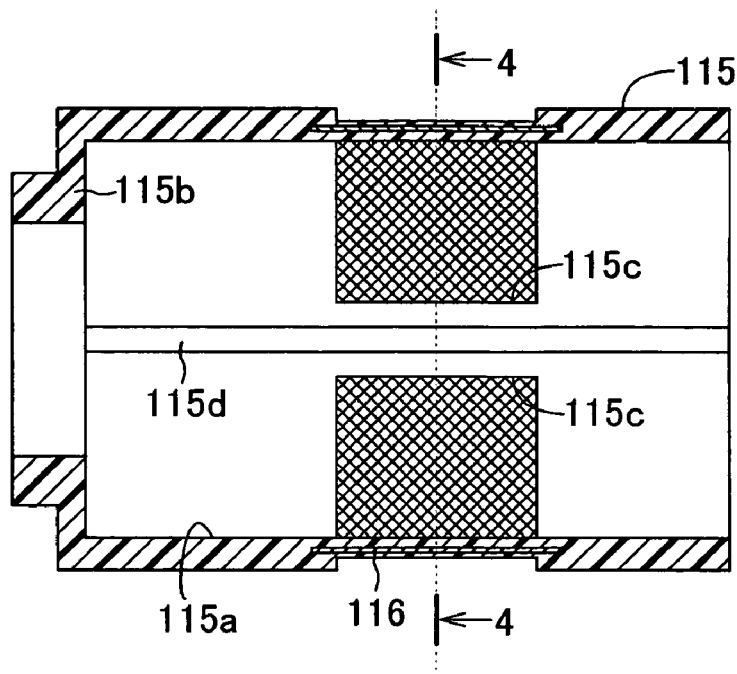
FIG. 3 is an enlarged sectional view of a second cylinder member shown in FIG. 2.
Figure 4:
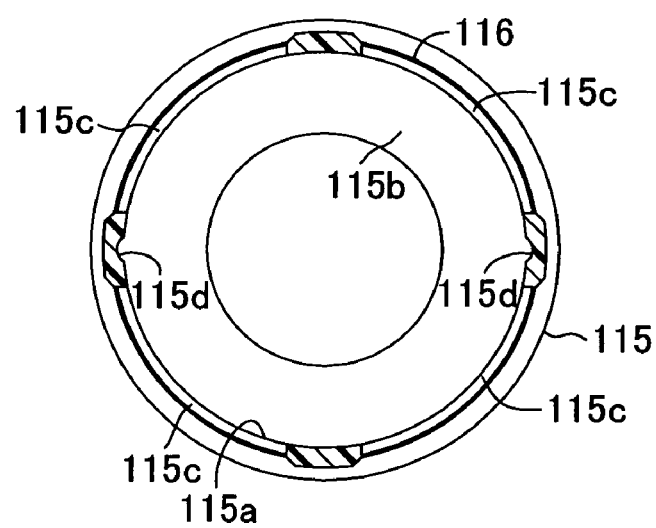
FIG. 4 is a sectional view taken along line 4-4 of FIG. 3.

FIGS. 2 to 4 show a second embodiment of a piston pump according to the present invention. In the piston pump of the second embodiment, a pump housing 111 has a suction port 111a, a discharge port 111b, and an internal cavity 111c. A first cylinder member 113, a second cylinder member 115, a piston 117, a sliding ring 119, a suction valve V1, and a discharge valve V2, among others, are built into the internal cavity 111c of the pump housing 111.

The first cylinder member 113 is a press-shaped metal part (or may be, for example, a forged part or a resin-molded part) and is formed without involvement of cutting. The first cylinder member 113 has a cylinder bore 113a and a circumferential protrusion 113d as well as a valve hole 113b and a valve seat 113c for the discharge valve V2. The first cylinder member 113 is fitted, at the circumferential protrusion 113d, into the internal cavity 111c of the pump housing 111 in a fluid-tight condition. A cap 121 prevents the first cylinder member 113 from coming off the pump housing 111. A first end portion 117a of the piston 117, an annular seal member 123, and the suction valve V1 are built into the cylinder bore 113a; and a piston return spring 125 is also built into the cylinder bore 113a.

The second cylinder member 115 is a resin-molded part (or may be, for example, a forged part or a press-shaped part) and is formed without involvement of cutting. The second cylinder member 115 has a cylinder bore 115a and a circular projection 115b projecting radially inward at its second end portion (left-hand end portion in FIG. 2), through which a second end portion of the piston 117 extends. The second cylinder member 115 is fitted into the internal cavity 111c of the pump housing 111 in a fluid-tight condition while being press-fitted, at its first end portion (right-hand end portion in FIG. 2), coaxially onto a leading end portion of the first cylinder member 113. As shown in FIGS. 2 to 4, a plurality of suction holes 115c are formed at an axially intermediate portion of the second cylinder member 115. A filter 116 is attached to the second cylinder member 115 at a position corresponding to the suction holes 115c. The filter 116 is a single unit member having a cylindrical shape.

The sliding ring 119 is built into the cylinder bore 115a of the second cylinder member 115 in an axially movable condition to thereby dividingly form a suction chamber R1 and a discharge chamber R2 in a space provided between the piston 117 and the second cylinder member 115. As shown in FIGS. 3 and 4, two axially extending fine grooves 115d are formed on the inner circumferential wall of the second cylinder member 115, along which the outer circumferential surface of the sliding ring 119 slides.

A second end portion 117b (an end portion projecting from the first cylinder member 113) of the piston 117 projects through the second cylinder member 115 in a noncontact condition and is fitted into the internal cavity 111c of the pump housing 111 in a fluid-tight, axially slidable condition via an annular guide ring 127 made of resin, and an annular seal member 129 made of rubber. The second end of the piston 117 is slidably engaged with the curved outer surface of an eccentric member 131, which is rotatably driven by means of an electric motor (not shown).

The first end portion 117a of the piston 117 and the annular seal member 123 attached to the second end portion partially define a pump chamber Ro in the cylinder bore 113a. When rotation of the eccentric member 131 causes the piston 117 to move axially against a biasing force of the piston return spring 125, the volume of the pump chamber Ro decreases. When the piston 117 is axially biased by the piston return spring 125, the volume of the pump chamber Ro increases.

The piston 117 has an axially extending communicating bore 117c and radially extending communicating holes 117d and 117e formed therein. The communicating bore 117c extends along the axis of the piston 117, and its one end serves a valve hole for the suction valve V1. The communicating holes 117d and 117e communicate with the communicating bore 117c at their radially inner ends. A circumferential mounting groove 117f is formed on the piston 117 and is adapted to accommodate a radially inner portion of the sliding ring 119 such that the sliding ring 119 can axially move by a predetermined amount. Radially outer ends of the communicating holes 117d open at a bottom portion of the mounting groove 117f.

The sliding ring 119 dividingly forms the suction chamber R1 and the discharge chamber R2 in a space provided between the second cylinder member 115 and the piston 117. The sliding ring 119 is adapted to charge liquid into the discharge chamber R2 from the suction chamber R1 via the mounting groove 117f, the communicating holes 117d, the communicating bore 117c, and the communicating holes 117e formed in the piston 117, and into the pump chamber Ro from the discharge chamber R2 via the communicating holes 117e and the communicating bore 117c formed in the piston 117, and the suction valve V1 by means of axially reciprocating in relation to the piston 117 and the second cylinder member 115 and synchronously with a change in the volume of the pump chamber Ro. Liquid is sucked into the suction chamber R1 from the suction port 111a of the pump housing 111 via the suction holes 115c of the second cylinder member 115 and the filter 116.

The piston return spring 125 is a compression coil spring and is interposed between the first cylinder member 113 and the piston 117 while a preload is imposed thereon. The piston return spring 125 biases the piston 117, the sliding ring 119, and the suction valve V1, among others, toward the eccentric member 131.

The suction valve V1 is provided at an end portion of the piston 117 located on the side toward the pump chamber Ro. The suction valve V1 includes a ball valve body 133, which is seated on or departs from a valve seat 117g formed on the piston 117; and a spring 137 interposed between the ball valve body 133 and a spring retainer 135 (fixedly attached to the piston 117) and biasing the ball valve body 133 toward the valve seat 117g by means of imposing a small load on the ball valve body 133. The suction valve V1 opens when the volume of the pump chamber Ro increases, and closes when the volume decreases.

The discharge valve V2 is provided at a discharge end portion of the first cylinder member 113. The discharge end portion corresponds to the discharge side of the pump chamber Ro. The discharge valve V2 includes a ball valve body 141, which is seated on or departs from the valve seat 113c formed on the first cylinder member 113; and a spring 143 interposed between the ball valve body 141 and the cap 121 and biasing the ball valve body 141 toward the valve seat 113c by means of imposing a small load on the ball valve body 141. The discharge valve V2 closes when the volume of the pump chamber Ro increases, and opens when the volume decreases.

In the thus-configured piston pump of the second embodiment, when the electric motor (not shown) rotates the eccentric member 131, the eccentric member 131 and the piston return spring 125 cooperatively function to axially reciprocate the piston 117, thereby alternately increasing and decreasing the volume of the pump chamber Ro. The suction valve V1 and the discharge valve V2 function accordingly, whereby liquid flows from the suction port 111a to the discharge port 111b.

When the volume of the pump chamber Ro increases, the sliding ring 119 shuts off communication between the suction chamber R1 and the discharge chamber R2; liquid is charged into the pump chamber Ro from the discharge chamber R2 whose volume decreases, via the communicating holes 117e, the communicating bore 117c, and the suction valve V1; and liquid is charged into the suction chamber R1 whose volume increases, from the suction port 111a via the filter 116. When the volume of the pump chamber Ro decreases, the sliding ring 119 allows communication between the suction chamber R1 and the discharge chamber R2 as shown in FIG. 2; and liquid is charged into the discharge chamber R2 whose volume increases, from the suction chamber R1 whose volume decreases.

In the piston pump of the second embodiment, the first cylinder member 113 and the second cylinder member 115 are formed without involvement of cutting. In contrast to the case where cutting is involved in formation of the first and second cylinder members, the first cylinder member 113 and the second cylinder member 115 can be manufactured at lower cost. Since the first cylinder member 113 and the second cylinder member 115 are formed without involvement of cutting, generation of foreign matter, such as burrs, can be suppressed in the course of manufacture thereof. Thus, entry of such foreign matter into the piston pump can be prevented.

In the piston pump of the second embodiment, the first end portion of the second cylinder member 115 is press-fitted onto the leading end portion of the first cylinder member 113, and the projection 115b is formed at the second end portion of the second cylinder member 115 in such a manner as to be capable of abutting a stepped portion of the piston 117 and serves as a stopper for preventing the piston 117 in abutment with the same from moving beyond the same. Thus, through employment of a simple structure of forming the projection 115b on the second cylinder member 115, the first cylinder member 113, the second cylinder member 115, the piston 117, the sliding ring 119, and the like can be subassembled into a subassembly before being built into the pump housing 111.

In the piston pump of the second embodiment, the second cylinder member 115 is a resin-molded part, and the filter 116 through which liquid flows from the suction port 111a to the suction chamber R1 is attached to the second cylinder member 115. Thus, the second cylinder member 115 also serves as a support member for the filter 116. In the piston pump of the second embodiment, the second end portion 117b of the piston 117 projects through the second cylinder member 115 in a noncontact condition, and the piston 117 is supported, at the second end portion 117b, in an axially movable condition by the pump housing 111 via the annular guide ring 127 and the annular seal member 129.

The annular seal member 129 provided in the second embodiment between the pump housing 111 and the second end portion 117b of the piston 117 yields the following functions yielded in the conventional self-priming piston pump: the function of a piston seal ring intervening between the piston and the second cylinder member (a function of shutting off communication between the interior and the exterior of the second cylinder member); and the function of a cylinder seal ring intervening between the second cylinder member and the pump housing (a function of shutting off communication between the interior and the exterior of the pump housing). Thus, the number of seal members used in the piston pump can be reduced, thereby contributing to a reduction in the number of component parts of the piston pump.

In the piston pump of the second embodiment, the annular seal member 129 is mounted in the pump housing 111 at a position corresponding to the second end portion 117b of the piston 117, and the second end portion; i.e., the projection 115b, of the second cylinder member 115 restricts axial movement of the annular seal member 129. Thus, the projection 115b of the second cylinder member 115 can function as a stopper for preventing the annular seal member 129 from coming off.

In the piston pump of the second embodiment, the axially extending fine grooves 115d are formed on the inner circumferential wall of the second cylinder member 115, along which the outer circumferential surface of the sliding ring 119 slides. Thus, without impairing the charging function obtained through axial movement of the sliding ring 119, air can be reliably removed from the discharge chamber R2 via the fine grooves 115d in the course of removing air from the piston pump of the present embodiment, which is used as a liquid pump.

In the second embodiment, the annular seal member 129 that intervenes between the pump housing 111 and the piston 117 and shuts off communication between the interior and the exterior of the pump housing 111 is mounted in the pump housing 111. However, as in the case of a third embodiment of the present invention shown in FIG. 5, the annular seal member 129 that intervenes between the pump housing 111 and the piston 117 and shuts off communication between the interior and the exterior of the pump housing 111 may be mounted on the piston 117.

Figure 5:
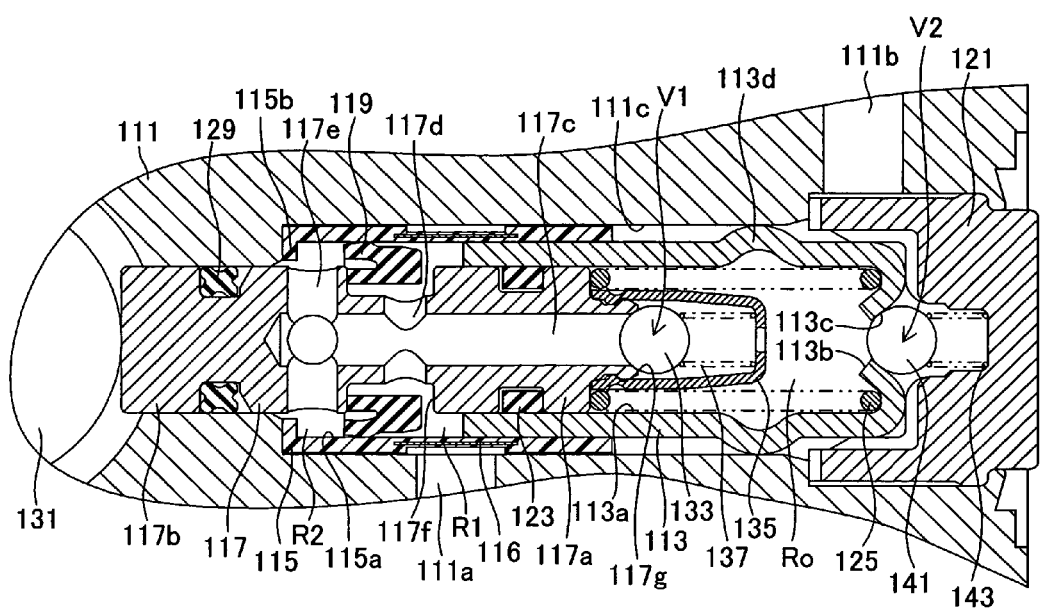
FIG. 5 is a general, configurational view showing a piston pump according to a third embodiment of the present invention.

The third embodiment shown in FIG. 5 is substantially identical with the above-described second embodiment except for the following: the annular seal member 129 is mounted on the piston 117; and the stepped portion is not provided on the piston 117, and the projection 115b formed on the second end portion of the second cylinder member 115 can abut the sliding ring 119 and serves as a stopper for preventing the sliding ring 119 in abutment with the same from moving beyond the same to thereby prevent coming off of the piston 117. Thus, the same structural features are denoted by common reference numerals, and repeated description thereof is omitted. Since action and effect yielded by the third embodiment are similar to those yielded by the second embodiment, repeated description thereof is also omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A piston pump comprising: a pump housing having a suction port, a discharge port, and an internal cavity; a first cylinder member having a cylinder bore and built into the internal cavity of the pump housing; a piston built into the cylinder bore of the first cylinder member to thereby form a pump chamber in the cylinder bore, the piston being axially reciprocated along a central axis of the first cylinder member so as to increase and decrease a volume of the pump chamber; a suction valve provided in the piston, the suction valve opening when the volume of the pump chamber increases, and closing when the volume decreases; and a discharge valve provided at a discharge side of the pump chamber, the discharge valve opening when the volume of the pump chamber decreases, and closing when the volume increases, wherein the piston is axially reciprocated so as to increase and decrease the volume of the pump chamber to thereby cause fluid to flow from the suction port to the discharge port, and wherein a circumferential protrusion, formed wholly around the outer circumferential surface of the first cylinder member, having a smooth exterior shape, and possessing an arc shape in a cross-sectional view of the first cylinder member along a plane containing the central axis of the first cylinder member, is formed externally at an axially intermediate portion of the first cylinder member; the first cylinder member is press-fitted, only at a whole circumference of an apex of the arc shape, into the internal cavity of the pump housing in a fluid-tight condition; and a leading end portion of the first cylinder member has a diameter smaller than that of the internal cavity of the pump housing, the leading end portion extending from the circumferential protrusion in a direction of insertion of the first cylinder member into the pump housing.

2. A piston pump according to claim 1, wherein the first cylinder member is a press-shaped part, and the circumferential protrusion is formed such that a portion of the first cylinder member protrudes radially outward in an expanded condition.

3. A piston pump according to claim 1, wherein the circumferential protrusion is formed outside a range of reciprocation of the piston.

4. A piston pump according to claim 3, wherein a bottom wall having a valve hole and a valve seat formed for the discharge valve is formed at a discharge end portion of the first cylinder member, and the circumferential protrusion is located in the vicinity of the bottom wall.

5. A piston pump according to claim 1, further comprising a cylindrical case made of resin for supporting a filter through which fluid flows from the suction port to the discharge port, the cylindrical case being fitted onto the leading end portion of the first cylinder member and being fitted into the internal cavity of the pump housing.

6. A piston pump according to claim 1, further comprising: a second cylinder member disposed coaxially at the leading end portion of the first cylinder member and built into the internal cavity of the pump housing; and a sliding ring built into a cylinder bore of the second cylinder member to thereby dividingly form a suction chamber communicating with the suction port, and a discharge chamber communicating with the pump chamber or the suction chamber, and adapted to charge fluid into the discharge chamber from the suction chamber and into the pump chamber from the discharge chamber by means of axially reciprocating in relation to the piston and the second cylinder member and synchronously with a change in the volume of the pump chamber; wherein the first cylinder member and the second cylinder member are formed without involvement of cutting.

7. A piston pump according to claim 6, wherein a first end portion of the second cylinder member is press-fitted onto the leading end portion of the first cylinder member, and a projection is formed at a second end portion of the second cylinder member in such a manner as to be capable of abutting the sliding ring or the piston so as to prevent coming off of the piston.

8. A piston pump according to claim 6, wherein the second cylinder member is a resin-molded part, and a filter through which fluid flows from the suction port to the suction chamber is attached to the second cylinder member.

9. A piston pump according to claim 6, wherein an end portion of the piston projecting from the first cylinder member projects through the second cylinder member in a non-contact condition, and the piston is supported, at the end portion projecting from the second cylinder member, in an axially movable condition by the pump housing via an annular seal member.

10. A piston pump according to claim 9, wherein the annular seal member is mounted in the pump housing at a position corresponding to the projecting end portion of the piston, and the second end portion of the second cylinder member restricts axial movement of the annular seal member.

11. A piston pump according to claim 6, wherein axially extending fine grooves are formed on an inner circumferential wall of the second cylinder member, along which inner circumferential wall an outer circumferential surface of the sliding ring slides.

* * * * *